United States Patent [19]

Martin

[11] 3,939,080

[45] Feb. 17, 1976

[54] COMPOSITION FOR NEUTRALIZING STATIC ELECTRICITY

[75] Inventor: Edwin B. Martin, Greenville, S.C.

[73] Assignee: Mar-Chem, Incorporated, Greenville, S.C.

[22] Filed: Oct. 10, 1973

[21] Appl. No.: 404,867

[52] U.S. Cl. ............................ 252/1; 55/84; 55/89; 252/8.8
[51] Int. Cl.² ............................................. H05F 1/00
[58] Field of Search ............ 252/180, 8.8, 1; 55/89, 55/84; 117/139.5 CQ; 317/262 AE; 260/576.6 M

[56] References Cited

UNITED STATES PATENTS 2,678,316    5/1954    Harris .................................. 260/290

Primary Examiner—Leland A. Sebastian
Assistant Examiner—Deborah L. Kyle
Attorney, Agent, or Firm—Parrott, Bell, Seltzer, Park & Gibson

[57] ABSTRACT

Static electricity otherwise present in a room to which an air washer delivers a flow of air is neutralized by use of a composition which includes dodecylbenzyl-triethyl-ammonium chloride.

5 Claims, No Drawings

COMPOSITION FOR NEUTRALIZING STATIC ELECTRICITY

In certain industries, the presence of static electricity in a room where certain processes are carried out has a decidedly adverse effect on the quality of the products or the smoothness with which the processes go forward. One particular example of such an industry is the textile industry, in which textile fibers are processed into textile yarns and textile fabrics. Particularly in the spinning of fiber into yarn, static electricity interferes with smooth processing of the fiber. Manifestly, the neutralization of static electricity under such circumstances would be highly desirable.

Certain industries which have encountered difficulty with static electricity, and notably the textile industry, employ a type of air conditioning equipment known as a "air washer" in maintaining desired conditions. As herein used, the term "air washer" refers to spray equipment in which liquid (conventionally water) is sprayed into an air flow. Such spray equipment or air washers may, for example only, include adiabatic water sprays for evaporative cooling and chilled water sprays which may both dehumidify and cool. Conventionally, an air washer includes a reservoir or tank in which a body of water is retained, a pump for circulating the body of water from the reservoir to a spray manifold, sprays through which the water is discharged into an air flow, separator plates for removing drops of liquid from the air flow and returning them to the reservoir, and a make-up water supply for maintaining the recirculating body of water at a predetermined level within the reservoir. An alternate arrangement which is also used provides a sump tank in which chilled water is retained and remote air washer stations to which the water is circulated. Such air washers and their use in the textile industry are generally well known to persons skilled in the arts of air-conditioning and textile manufacturing. As here used, the term "air washer" means either of these alternate arrangements.

Having in mind the desirability of reducing static electricity and the use of air washers, it is an object of this invention to promote the neutralization of static electricity by treating a body of water recirculated in an air washer. In accomplishing this object of the present invention, the body of water recirculating in the air washer has a quantity of a quatenary ammonium compound mixed therein, in a concentration effective for reducing static electricity in a room to which the air washer delivers a flow of air.

A further object of this invention is to make available, to a concern operating an air washer, a composition for treating water which is effective for neutralizing static electricity in a room to which an air washer delivers a flow of air. In realizing this object of the invention, a composition is prepared which comprises water and dodecylbenzyl-triethyl-ammonium chloride.

Many air washer installations employ various materials as some portion of the air washer structure. For this reason, it has been found desirable in maintaining the efficiency of an air washer to incorporate into a composition in accordance with this invention a constituent which inhibits rust in the air washer. Accordingly, this invention contemplates the incorporation of an isopropanolamine for accomplishing that function.

Additionally, efficiency of recirculation of the body of water in an air washer is favored by reduction of foaming. To accomplish that end, it is preferred that the composition in accordance with this invention incorporate a silicone emulsion for inhibiting foam.

EXAMPLE I

To ten gallons of a fifty percent (50%) (by weight) solution of dodecylbenzyl-triethyl-ammonium chloride in water was added one hundred twenty-eight (128) fluid ounces of a silicone emulsion defoamer and two hundred fifty-six (256) fluid ounces of an isopropanolamine rust inhibitor. This mixture was then diluted with a quantity of water sufficient to produce fifty-five (55) gallons and the resultant solution was fed continuously via a drip feeder arrangement into the reservoir of an air washer which contained approximately 18,000 gallons of water, with the feed rate being approximately thirty two (32) ounces per 24 hour period. The feed rate was directed at maintaining a level of approximately 100 parts per million of the solution fed into the air washer. An analysis of yarn breakage in a spinning room supplied with air delivered by the air washer revealed a reduction in ends down per thousand spindle hours following feeding of the composition into the air washer reservoir, which was attributed to improved neutralization of static electricity.

EXAMPLE II

To ten (10) gallons of a fifty percent (50%) (by weight) solution of dodecylbenzyl-triethyl-ammonium chloride in water was added one hundred twenty-eight (128) fluid ounces of a silicone emulsion for inhibiting foaming and two hundred fifty-six (256) fluid ounces of an isopropanolamine for inhibiting rust. The resultant composition was then further diluted with water to produce a volume of fifty-five (55) gallons, which was then fed by a drip feeder arrangement into the reservoir of an air washer which contained approximately 2,000 gallons of water. The drip feed arrangement was adjusted to deliver approximately sixteen (16) ounces per 24 hour period. Observation of the carding of textile fibers in a room to which air was delivered by the air washer indicated improved carding performance which was attributed to the reduction of static electricity.

These and other experiences suggest that compositions in accordance with this invention may be formulated by employing a quantity of 50% (by weight) dodecylbenzyl-triethyl-ammonium chloride and water in the range from about eight gallons to about thirty gallons into which are mixed isopropanolamines for inhibiting rust in a range from about one hundred twenty-eight fluid ounces to about two hundred fifty-six fluid ounces and a silicone emulsion for inhibiting foaming in the range from about one hundred twenty-eight fluid ounces to about two hundred fifty-six fluid ounces. This composition may then, if desired, be diluted to a standard package measure such as 55 gallons for delivery and use. The composition is then delivered in effective quantities into the reservoir or tank of an air-washer system either at a central sump or at an individual station.

In the specification, there has been set forth a preferred embodiment of the invention, and although specific terms are employed, they are used in a generic and descriptive sense only and not for purposes of limitation.

That which is claimed is:

1. A composition for treating water recirculated in an air washer and characterized by having sufficient ionic activity to be effective for neutralizing static electricity in a room to which the air washer delivers a flow of air, the composition consisting essentially of about fifty percent by weight dodecylbenzyl-triethyl-ammonium chloride; water in such quantity as to constitute substantially the remainder of the composition; and from about four fluid ounces per gallon of the composition to about thirty fluid ounces per gallon of the composition of an additive selected from the group consisting of rust inhibiting agents and anti-foaming agents.

2. A composition for treating water recirculated in an air washer and characterized by having sufficient ionic activity to be effective for neutralizing static electricity in a room to which the air washer delivers a flow of air, the composition consisting essentially of isopropanolamine in the amount of from about four fluid ounces per gallon of the composition to about thirty fluid ounces per gallon of the composition; dodecylbenzyl-triethyl-ammonium chloride in the amount of about fifty percent by weight of the composition; and water in such amount as to constitute the remainder of the composition.

3. A composition for treating water recirculated in an air washer and characterized by having sufficient ionic activity to be effective for neutralizing static electricity in a room to which the air washer delivers a flow of air, the composition consisting essentially of a silicone emulsion in the amount of from about four fluid ounces per gallon of the composition to about thirty fluid ounces per gallon of the composition; dodecylbenzyl-triethyl-ammonium chloride in the amount of about fifty percent by weight of the composition; and water in such amount as to constitute the remainder of the composition.

4. A composition for treating water recirculated in an air washer and characterized by having sufficient ionic activity to be effective for neutralizing static electricity in a room to which the air washer delivers a flow of air, the composition consisting essentially of a rust inhibitor in the amount of from four fluid ounces per gallon of the composition to about thirty fluid ounces per gallon of the composition; an anti-foaming agent in the amount of from about four fluid ounces to about thirty fluid ounces per gallon of the composition; dodecylbenzyl-triethyl-ammonium chloride in the amount of about fifty percent by weight of the composition; and water in such amount as to constitute the remainder of the composition.

5. A composition for treating water recirculated in an air washer and characterized by having sufficient ionic activity to be effective for neutralizing static electricity in a room to which the air washer delivers a flow of air, the composition consisting essentially of isopropanolamine in the amount of from about four fluid ounces per gallon of the composition to about thirty fluid ounces per gallon of the composition; a silicone emulsion in the amount of from about four fluid ounces per gallon of the composition to about thirty fluid ounces per gallon of the composition; dodecylbenzyl-triethyl-ammonium chloride in the amount of about fifty percent by weight of the composition; and water in such amount as to constitute the remainder of the composition.

* * * * *